(12) United States Patent
Lee

(10) Patent No.: US 8,612,350 B2
(45) Date of Patent: Dec. 17, 2013

(54) TRAVEL ACCOUNT

(75) Inventor: Willis Lee, Maricopa, AZ (US)

(73) Assignee: Ebay Inc., San Jose, CA (US)

( * ) Notice: Subject to any disclaimer, the term of this patent is extended or adjusted under 35 U.S.C. 154(b) by 0 days.

(21) Appl. No.: 13/328,477

(22) Filed: Dec. 16, 2011

(65) Prior Publication Data

US 2013/0159185 A1    Jun. 20, 2013

(51) Int. Cl.
*G06Q 40/00*    (2012.01)
(52) U.S. Cl.
USPC .................................. 705/44; 705/35; 705/39
(58) Field of Classification Search
USPC ............................................. 705/35, 39, 44
See application file for complete search history.

(56) References Cited

U.S. PATENT DOCUMENTS

2007/0203836 A1\* 8/2007 Dodin ............................ 705/44
2008/0275820 A1\* 11/2008 Joao et al. ...................... 705/44

\* cited by examiner

*Primary Examiner* — Lalita M Hamilton
(74) *Attorney, Agent, or Firm* — Haynes and Boone LLP

(57) ABSTRACT

A user can set up a travel account with a payment provider, to inform the payment provider of expected dates and locations of travel, along with limits or restrictions at the various locations and/or dates. When the user travels and attempts to make a payment, the payment provider can determine the location and date to aid in processing the payment request, resulting in an easier process for the user, while still providing additional security with the limits and restrictions.

20 Claims, 4 Drawing Sheets

TRAVEL ACCOUNT

BACKGROUND

1. Field of the Invention

The present invention generally relates to payment provider accounts, and more particularly, to using such accounts during travel.

2. Related Art

Electronic payments are becoming a preferred method of payment because they offer advantages to the user not present with traditional physical payments. With a physical payment, the user is required to carry the funding instrument and present the funding instrument when ready to make a payment. Examples of physical funding instruments include cash, checks, credit cards, debit cards, coupons, gift certificates, gift cards, and the like. These can take up space in a user pocket, purse, or wallet. To reduce space, the consumer may not carry all funding instruments all the time, resulting in the possibility that a desired funding instrument is not available when the consumer is ready to use it at a point of sale (POS). Such physical funding instruments may also be lost or stolen. Thus, physical "wallets" can be cumbersome, inconvenient, and prone to loss.

To remedy this, mobile devices have been and are being used to make payments through payment providers, such as PayPal, Inc. of San Jose, Calif. Such payment providers typically allow a consumer to make a payment through the user's mobile device, such as through the use of barcodes, communication between the payment provider and the merchant, and other methods. After authentication and/or authorization, the payment is made through a user account with the payment provider, where the account is funded through a funding source, such as the user's bank or credit card.

However, while mobile payments may be convenient, they are also prone to fraudulent activity. For example, if a user's mobile phone is lost or stolen, an unauthorized user may make a fraudulent payment through the mobile phone. As such, payment providers use various fraud detection tools to ensure a payment is properly made by an authorized user. One such tool is determining where the payment request is being made. If the user resides in a certain city or state and has made consistent payments within a certain location, but then one or more payment requests are made from another region or country, the payment provider may deny the payment or require additional authentication before approving the payment. This may be inconvenient for authorized users attempting to make a payment while traveling or at an unfamiliar (to the payment provider) location.

Therefore, a need exits for a payment solution that overcomes the disadvantages described above.

SUMMARY

According to one embodiment, a user having an account with a payment provider sets up a "travel" account that allows the user to specify details of the travel and place restrictions as desired. This enables the payment provider to determine whether a payment request made through the user device is at a location anticipated by the user. If the user is in a foreign country, but the payment provider knows the user is at the country during a specified date, the payment provider may more easily process a payment request. In addition, the user may restrict funds available at one or more different travel destinations to limit exposure to funds during the user's travel.

In one embodiment, the user may set up the travel account by indicating, to the payment provider, dates of travel, travel destinations or locations, and any restrictions at the one or more locations. The restrictions may be limits to dollar amount, number of transactions, time of transaction, etc.

When the user arrives at a destination specified in the user's travel account, the user may make a payment request as follows, according to one embodiment. The user logs into the user account with the payment provider, such as through a mobile app, web site, or mobile browser. The user may be asked to enter specific information, such as a user name, email address, password, and PIN. In one embodiment, the user may also be required to enter a number generated from a security token, such as a key fob, either physical or downloadable to the user device (e.g., a soft token generator). Once authenticated, the user may transmit information to the payment provider for the payment request. The information may include location information, payee information, transaction details, and amount. The payment provider may determine the location of the user through various means, including through location services on the user device. The payment provider accesses the user's account to determine whether the user is expected to be at the location and any restrictions or limitations on the account.

If the user is at the expected location, the payment provider may apply any restrictions or limitations when processing the payment request. For example, the payment request may be over the set limit at the current location. If the location is correct and any and all restrictions are met, the payment provider may approve the payment request quickly without having the user provide additional information.

However, if the payment request cannot be approved initially for a variety of reasons, the payment provider may request the user to resubmit information or provide additional information. For example, if the location is not the expected location or if the payment request is higher than the specified limit, the user may be asked one or more security questions to authenticate the user. If the payment provider is satisfied the user is the authorized user, the payment request may be approved.

As a result, the user is provided additional security when making payment requests while on travel, while at the same time not being inconvenienced with additional security questions because the user is not at a home location.

These and other features and advantages of the present invention will be more readily apparent from the detailed description of the embodiments set forth below taken in conjunction with the accompanying drawings.

BRIEF DESCRIPTION OF THE FIGURES

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1:
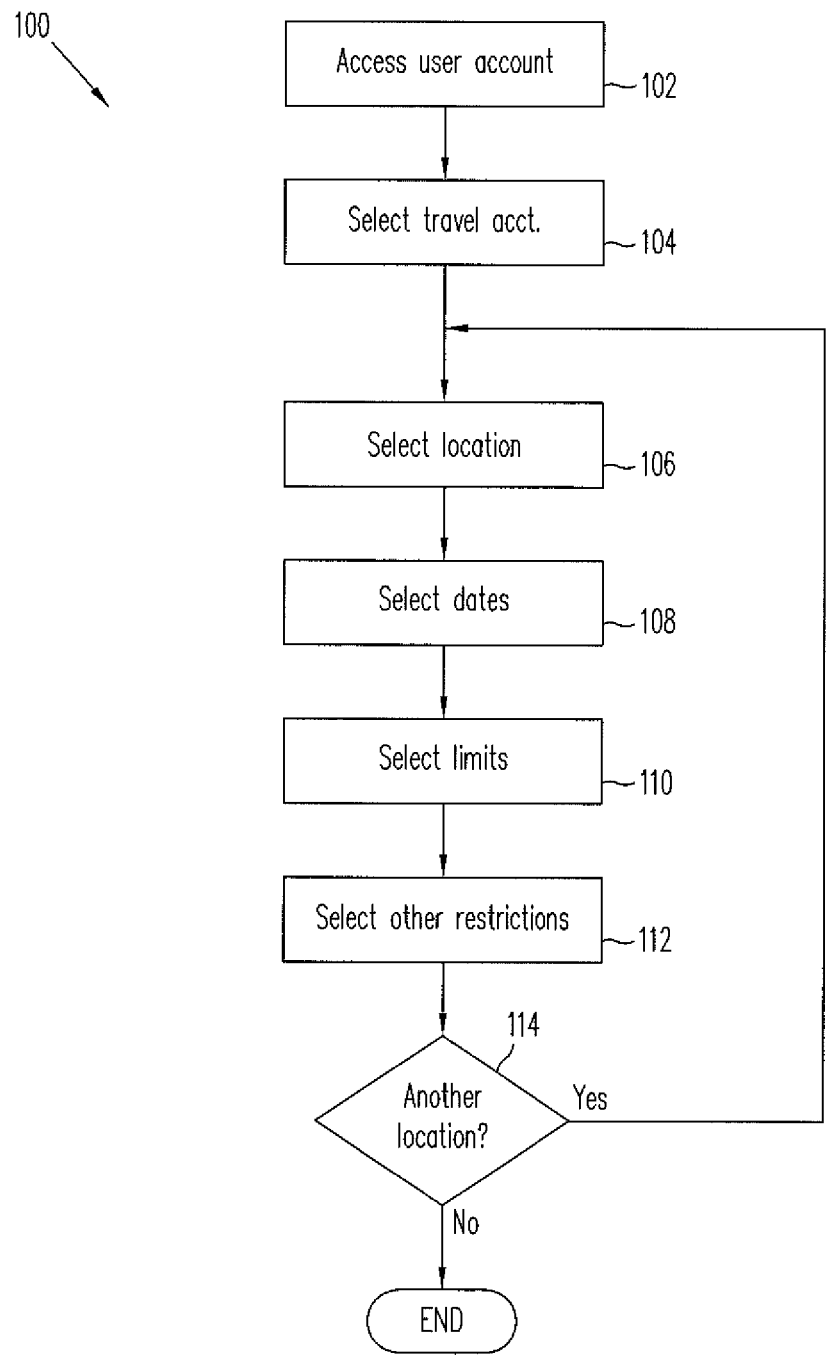
FIG. 1 is a flowchart showing a process a user performs to set up a travel account with a payment provider, according to one embodiment.

FIG. 1 is a flowchart showing a process 100 a user performs to set up a travel account with a payment provider, such as PayPal Inc. of San Jose, Calif., according to one embodiment. A user may wish to set up the travel account when the user is expecting to travel outside the user's local or home area and to use the services of the payment provider for payments. At step 102, the user accesses a user account with the payment provider. The user may access the account through a user device, such as a smart phone, a computing tablet, a PC, or other computing device. For a smart phone, the user may access a mobile app, which makes a call to the payment provider and displays a login screen on the smart phone. For a PC, the user may enter the URL address of the payment provider and select a link on the payment provider site that opens a login page.

To access the user's account, the user may be asked to enter specific information, such as a user identifier and a login credential. These may include a user name, an email address, a phone number, a password, or a PIN. The requested information is then communicated to the payment provider, such as through the user device or other means like a phone call or voice. If the user can be authenticated, the user is provided access to the user's account by the payment provider.

Once the user accesses the account, the user may see a home page of the account. On the home page may be an option to create, revise, view, or otherwise access a travel account. This may be in the form of a tab, link, button, or other user-selectable means. The user may select this option at step 104 to access the travel account option. The user may then be directed to a new screen or a pop-up screen having travel account information.

At step 106, the user may enter a location or destination for travel. For example, the user may be planning a trip to Europe and will be visiting London, Rome, Venice, and Paris. The user may enter the location in any number of ways. For example, the user may enter a city, a state, or province. The user may also select desired location from a map, where the user may select a specific region and be presented with a more detailed map of that region, such as a map of Europe, then Western Europe, then Great Britain. The user may be asked to confirm the selected location or revise as needed.

At step 108, the user may select the dates the user plans on being at the selected location. For the selected location, the user may enter a start and end date. The user may also select start and end dates from a pop-up calendar. For example, the user may specify that the user intends to be in London from Feb. 2, 2012 to Feb. 5, 2012. The user may be asked to confirm the dates for the location. Once confirmed, the user may be presented with the selected location and dates. The location and date information may be communicated in other ways. For example, the user may provide the payment provider a copy of the user's travel itinerary, which the payment provider can scan or otherwise process to populate the user's travel account.

At step 110, the user may select one or more limits at the location or date. For example, the user may want to limit account availability to $2000 USD while in London. The user may also or alternatively provide limits according to a day or days. For example, the user may set a limit of $100 USD on February 2, $1500 USD on February 3, and $200 USD on February 4 and February 5.

At step 112, the user may set other restrictions as desired for the location and/or dates. Other restrictions may include the number of transactions allowed each day, each period, or the location. Additional restrictions may also include time restrictions as to when a payment request is to be allowed or blocked based on when the payment request is made in local time. For example, if the user does not plan on doing any purchasing from 2 a.m. to 6 a.m. local time, the user may specify that any payment requests made during that time should be denied. Restrictions may also include the type of merchant or purchase. For example, the user may not expect to make any purchases from street vendors. In that case, the user may specify that any payment requests from street vendors be denied. The user may also specify that no payment requests received for digital goods purchases should be approved.

In addition to restrictions, the user may specify additional information, such as contact information at each location or date(s). For example, the user may provide a temporary cell phone number for each or all locations, hotel contact information, etc.

Note that one or more of the above steps may be combined, performed in a different sequence, omitted, or a combination thereof. Once the user has finished providing information for the first location, a determination is made at step 114 whether the user wishes to add another location. In the above example, London is a first destination for a multi-city trip. So, the user may want to add the other locations to the travel account. This may be done simply with a button or link from the user account page that the user can select to add another location. If the user is finished adding locations, the user may simply select a "finish" or other similar button or link to end the set-up process.

After entering each additional location and limits, the user may be presented with information about the current travel account. Once finished, the user may be presented with the final travel account information. For example, the user may see a page or listing that shows the user intends to be in London from Feb. 2, 2012 to Feb. 5, 2012, in Rome from Feb. 5, 2012 to Feb. 12, 2012, in Venice from Feb. 12, 2012 to Feb. 14, 2012, and in Paris from Feb. 14, 2012 to Feb. 21, 2012, with any associated limits or restrictions identified alongside each date or location.

The user may access the account at any subsequent time to revise any of the information in the user's travel account, such as a change in location, a change in dates, a change in limits, and/or a change in restrictions. In one embodiment, the user may only change one or more details while still in the user's home country or area. In other embodiments, the user may change details at any time prior to the date that the change is to take effect. If this is in another country, the user may be asked to provide additional authenticating information before the change is accepted by the payment provider.

Figure 2:
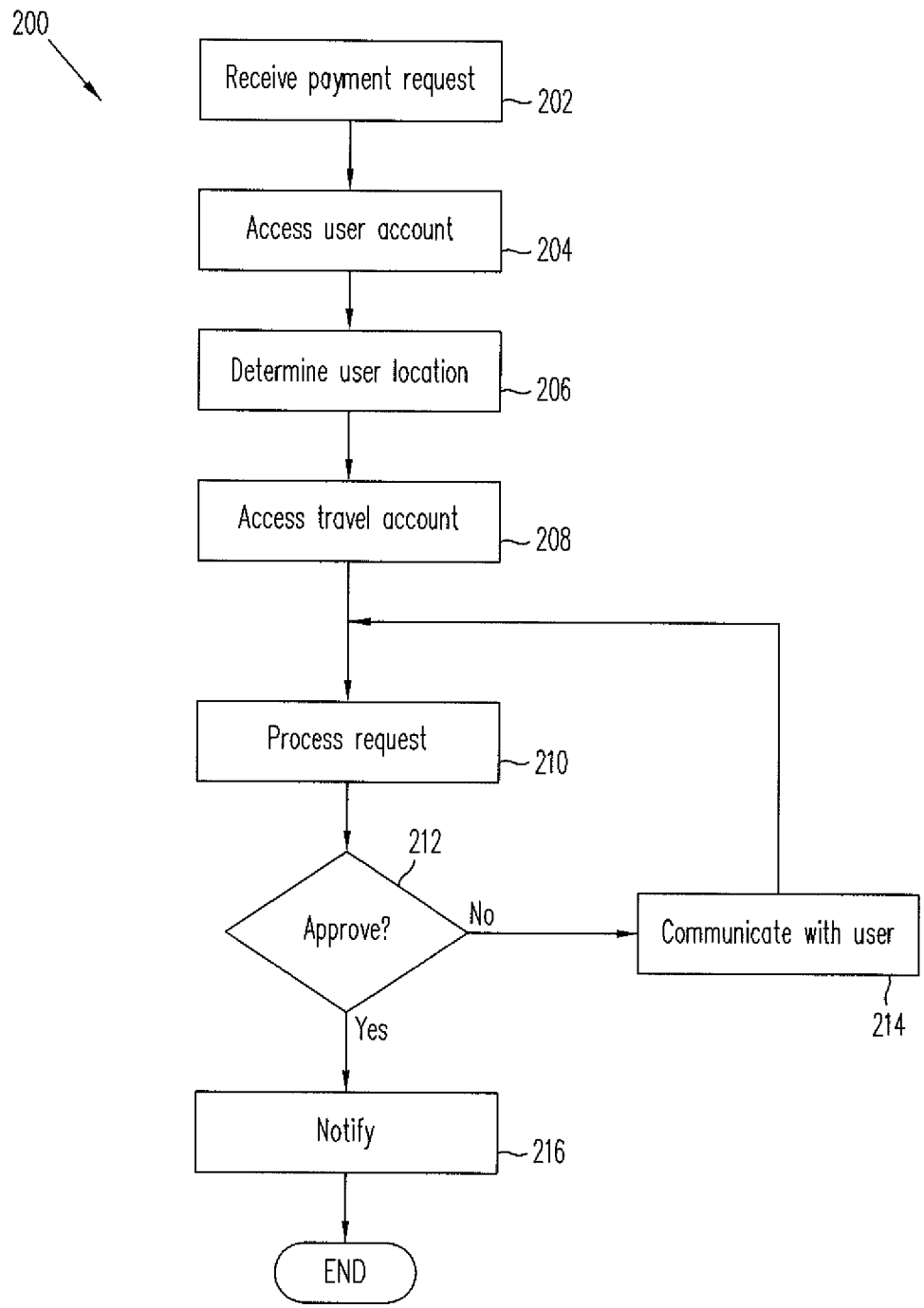
FIG. 2 is a flowchart showing a process a payment provider performs in processing a payment request from a user on travel according to one embodiment.

FIG. 2 is a flowchart showing a process 200 a payment provider performs in processing a payment request from a user on travel according to one embodiment. At step 202, the user has left the user's home and has arrived at one of the locations specified in the user's travel account. Using the above example, the user is in Venice on Feb. 14, 2012 and desires to make a payment through the user's payment provider account. The user may access the user's account by entering requested credentials, such as a user name and password/PIN, through a mobile app or browser on the user device. For additional security, the user may also be requested to enter a password generated from a security token, such as a fob or soft token generator.

The payment provider receives a payment request, at step 202, from the user or a payee. The payment request may be from a user device, such as a smart phone, a payee device, such as a merchant POS, or a third party device. The payment request may include information about the user, such as a mobile phone number, a user name, user email address, or other user identifier if not previously provided during account access, the merchant, such as a merchant identifier, merchant name, merchant account number, etc., and the transaction, such as a total amount of the payment request, information about individual items in the purchase request, including price and description. Some of this information may be automatically conveyed through the user device (e.g., mobile phone number), payee device (e.g., merchant identifier and/or transaction information), or third party device.

Upon receiving the payment request, the payment provider accesses the user's account at step 204, using information about the user provided either at step 202 or during the login process. The payment provider may search one or more databases having account information to determine whether an account exists for the user. Assuming a valid account exists, the payment provider determines, at step 206, the user location or the location where the payment request came from. This determination may be accomplished in any number of ways. For example, the transaction information may include location information. The location information may also come from the device communicating the payment request, such as through an IP address from a PC of the payee/merchant or location service on a mobile device of the user.

At step 208, the payment provider access the user's travel account from the user's primary account. This allows the payment provider to determine information contained in the travel account to aid in processing the payment request. Note that one or more of the steps above may be combined, performed in a different sequence, omitted, or a combination thereof.

At step 210, the payment provider processes the payment request based on the information received and available through the user's account and travel account. The payment provider may first determine whether the payment request came from a location designated by the user. For example, the user/payment request may be determined to have come from Moscow, which is not on the user's travel location list. This may prompt the payment provider to deny the payment request or require the user to provide additional information. In another example, the user/payment request may be determined to have come from London, which is a location specified in the user's travel account. This may pass a "first test" and move the payment provider to additional processing. In yet another example, the user/payment request location may be determined to have come from a small city just outside of London. Even though the city was not listed in the user travel account, an inference or assumption may be made by the payment provider that this is still within the London location. This assumption may depend on various analytics used by the payment provider and may prompt a request for additional information from the user.

Even if the payment request originated from a location identified in the user's travel account, the payment provider may still need to determine if the location matches with the dates specified by the user. For example, even though the payment request came from London, the request may have been sent Jan. 2, 2011, which is not a date the user was expected to be in London. As such, the payment provider may deny the request or require additional information from the user. However, if the payment request was sent on Feb. 4, 2012 (within the London travel dates), the payment provider may proceed with authorization without further involvement from the user assuming other conditions are met.

Processing may continue to determine whether any limits or restrictions are met or triggered. For example, the payment provider may determine whether there are any limits associated with the travel account, such as a maximum dollar amount or transaction number for the particular location and/or date. If that maximum would be exceeded by the payment request, the payment provider may deny the request or require additional information from the user. However, if approving the payment request would not exceed any limits, the payment provider may process and approve the payment without further input from the user.

In a further example, the payment provider may determine whether there are any use or time restrictions associated with the location and/or date. For example, the payment request from London on Feb. 4, 2012 is for $1000, is the tenth payment request from the user in London, and is made at 4 a.m. London time, and is for the purchase of a downloadable game. The payment provider may determine whether any of these conditions violate a limit or restriction for the user travel account. It may be that the dollar amount is within the limit, but the user has exceeded the number of payment requests, the request was made at a time not permitted by the user, and/or the type of purchase (digital good) is not allowed by the user. If one or more restrictions/limits are triggered by the payment request, the payment provider may deny the request or require the user to provide additional information.

Thus, after processing, a determination is made, at step 212, whether the payment request can be approved. If, for whatever reason, the payment request cannot be approved by the payment provider, the payment provider may optionally communicate with the user at step 214. Communication may be for requesting additional information in an attempt to better authenticate the user or obtain approval from the user of the payment request. For example, the payment provider may call a phone number specified by the user on the travel account or another phone number associated with the user's account. The user may then be asked one or more security questions, such as mother's maiden name, mother's birthday, social security number, etc. The payment provider may also ask whether the pending payment request was actually made by the user. The communication may also be through email, text, or other means. Based on the information received by the payment provider, the payment provider may process the request again at step 210.

If the payment request can be approved, a notification may be sent by the payment provider at step 214. Notification may be to the user and/or the payee or merchant via a smart phone, PC, laptop, tablet, POS device, etc. The notification may be through a receipt, confirmation number, message or the like, and may be conveyed by text, email, voice, or other means. Once the merchant confirms payment, either through the merchant, the payment provider, and/or the user, the merchant may release the purchase to the user.

As a result, the user may easily make a payment while traveling because the payment provider knows the user is expected to be at a certain location on certain dates. This eliminates the need to either deny the payment request or contact the user for additional information, which may be needed because of payment provider receives a payment request from a location not associated with the user. As a result, using the above, the user is provided a better user experience. In addition to easier payment processing while traveling, the travel account may also provide the user additional security for payments made abroad. This is due to the user being able to set limits and restrictions on payments made while on travel. Note that the travel account may be a separate account linked to the user's main payment provider account or part of the user's main payment provider account such that travel account is with the main account where the user can select a tab or link to toggle between the travel account and the main account.

Figure 3:
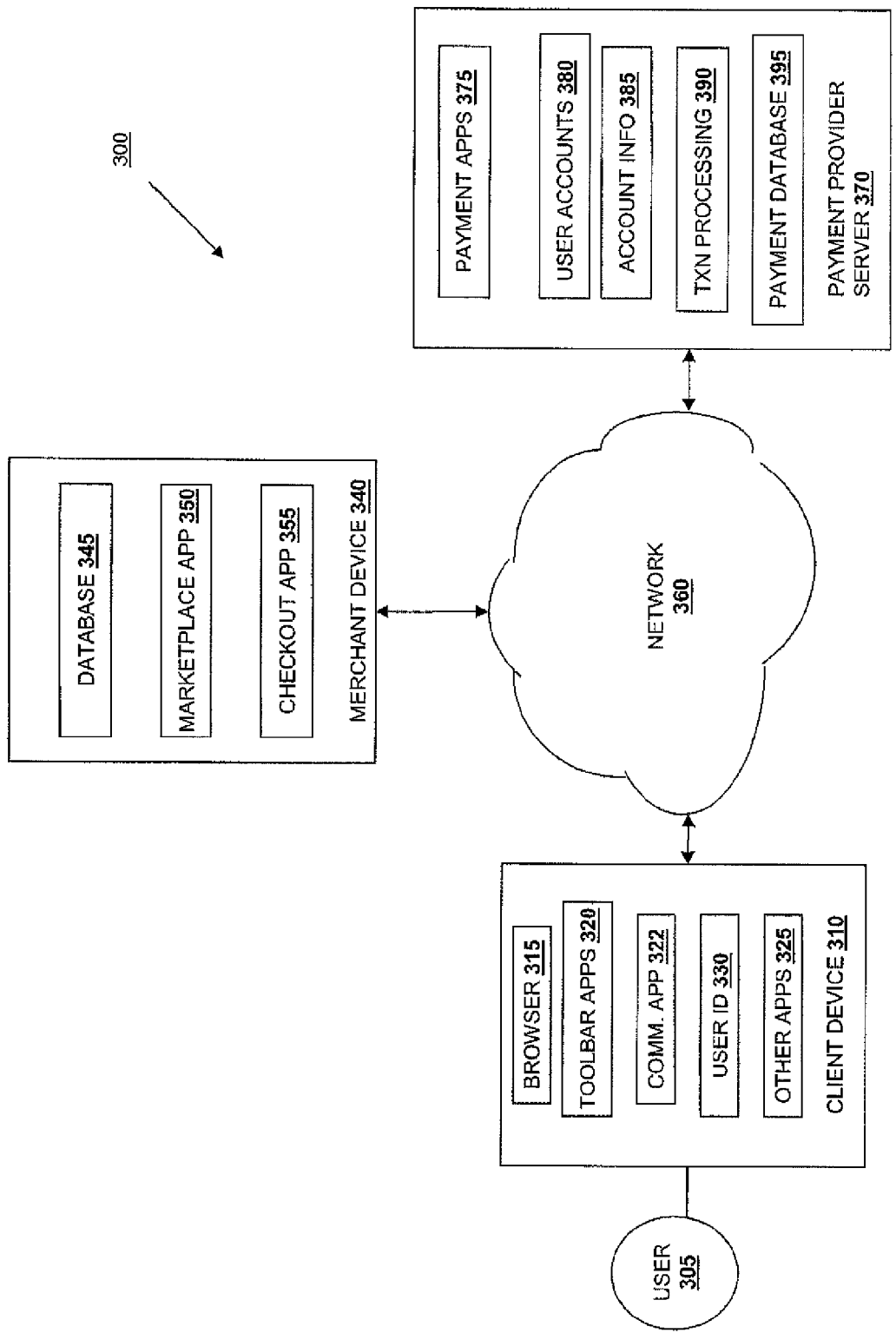
FIG. 3 is block diagram of a networked system suitable for implementing the process described herein according to an embodiment.

FIG. 3 is a block diagram of a networked system 300 configured to handle a transaction using a smart wallet, such as described above, in accordance with an embodiment of the invention. System 300 includes a user device 310, a merchant server 340, and a payment provider server 370 in communication over a network 360. Payment provider server 370 may be maintained by a payment provider, such as PayPal, Inc. of San Jose, Calif. A user 305, such as a sender or consumer, utilizes user device 310 to perform transactions using payment provider server 370, such as setting up and using a travel account.

User device 310, merchant server 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a smart phone, personal computer (PC), personal digital assistant (PDA), laptop computer, and/or other types of computing devices capable of transmitting and/or receiving data, such as an iPad™ from Apple™. The user may use different user devices to perform different transactions described above. For example, the user may use a PC or laptop to set up the travel account, but then use a smart phone to make the payment request while traveling.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet. User device 310 may also include one or more toolbar applications 320 which may be used, for example, to provide client-side processing for performing desired tasks in response to operations selected by user 305. In one embodiment, toolbar application 320 may display a user interface in connection with browser application 315 as further described herein.

User device 310 may further include other applications 325 as may be desired in particular embodiments to provide desired features to user device 310. For example, other applications 325 may include security applications for implementing client-side security features, programmatic client applications for interfacing with appropriate application programming interfaces (APIs) over network 360, or other types of applications. Applications 325 may also include email, texting, voice and IM applications that allow user 305 to send and receive emails, calls, and texts through network 360, as well as applications or mobile apps that enable the user to communicate, transfer information, and make payments through the payment provider while traveling as discussed above. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider. A communications application 322, with associated interfaces, enables user device 310 to communicate within system 300.

Merchant server 340 may be maintained, for example, by a merchant or seller offering various products and/or services in exchange for payment to be received over network 360. Merchant server 340 may be used for POS or online purchases and transactions. Generally, merchant server 340 may be maintained by anyone or any entity that receives money, which includes charities as well as retailers and restaurants. Merchant server 340 includes a database 345 identifying available products and/or services (e.g., collectively referred to as items) which may be made available for viewing and purchase by user 305. Accordingly, merchant server 340 also includes a marketplace application 350 which may be configured to serve information over network 360 to browser 315 of user device 310. In one embodiment, user 305 may interact with marketplace application 350 through browser applications over network 360 in order to view various products, food items, or services identified in database 345.

Merchant server 340 also includes a checkout application 355 which may be configured to facilitate the purchase by user 305 of goods or services identified by marketplace application 350. Checkout application 355 may be configured to accept payment information from or on behalf of user 305 through payment service provider server 370 over network 360, such as at a physical POS or online. For example, checkout application 355 may receive and process a payment confirmation from payment service provider server 370, as well as transmit transaction information to the payment provider and receive information from the payment provider (e.g., a transaction ID).

Payment provider server 370 may be maintained, for example, by an online payment service provider which may provide payment between user 305 and the operator of merchant server 340. In this regard, payment provider server 370 includes one or more payment applications 375 which may be configured to interact with user device 310 and/or merchant server 340 over network 360 to facilitate the purchase of goods or services, communicate/display information, and send payments by user 305 of user device 310 and as discussed above.

Payment provider server 370 also maintains a plurality of user accounts 380, each of which may include account information 385 associated with individual users, including travel account information for users. For example, account information 385 may include private financial information of users of devices such as account numbers, passwords, device identifiers, user names, phone numbers, credit card information, bank information, information for a user travel account, as discussed above, or other financial information which may be used to facilitate online transactions by user 305. Advantageously, payment application 375 may be configured to interact with merchant server 340 on behalf of user 305 during a transaction with checkout application 355 to track and manage payment requests and purchases made by users while on travel.

A transaction processing application 390, which may be part of payment application 375 or separate, may be configured to receive information from a user device and/or merchant server 340 for processing and storage in a payment database 395. Transaction processing application 390 may include one or more applications to process information from user 305 for processing a payment request and payment while the user is traveling as described herein. As such, transaction processing application 390 may store details of a payment request from a user or merchant. Payment application 375 may be further configured to determine the existence of and to manage accounts for user 305, as well as create new accounts if necessary, such as the set up, management, and use of a travel account for the user.

Figure 4:
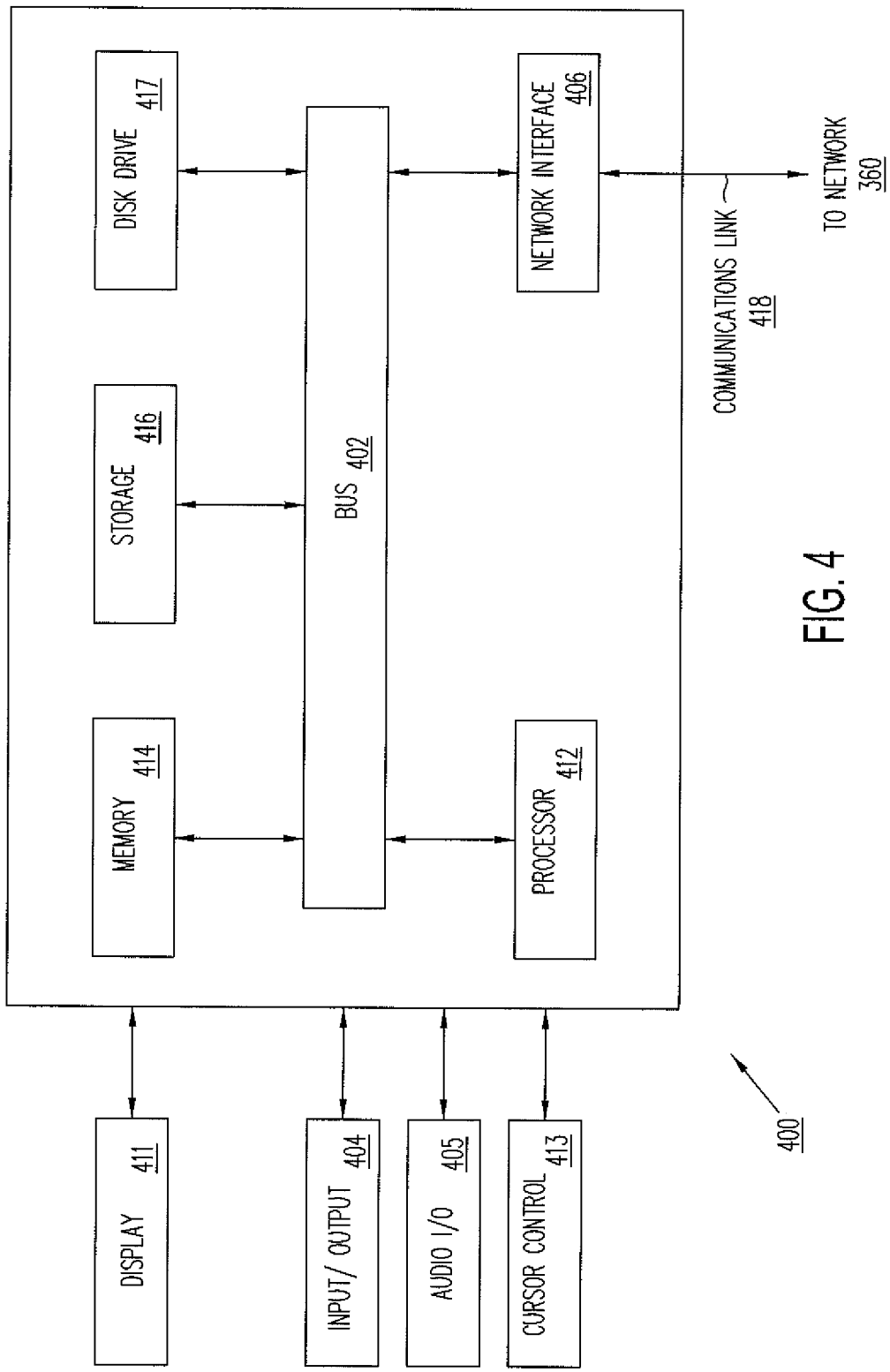
FIG. 4 is a block diagram of a computer system suitable for implementing one or more components in FIG. 3 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory storage device storing information about user accounts with a payment provider, wherein the information comprises travel information; and
a processor executing instructions to perform:
receiving authentication information to access a user account from a user when the user reaches a travel destination specified in the user account, wherein the authentication information includes a user ID and a password or PIN associated with the user account and a randomly generated password using a security token;

receiving a payment request;

determining a location and a time of the payment request;

accessing the user account associated with the payment request;

determining travel information for the user account, wherein the travel information comprises contact information provided by the user for expected locations the user expects to be at and wherein the contact information is different for at least two of the expected locations; and processing the payment request based, in part, on the travel information.

2. The system of claim 1, wherein the travel information comprises at least one location and at least one date for the user while on travel.

3. The system of claim 2, wherein the travel information further comprises payment request limits for each location.

4. The system of claim 1, wherein the payment request is received from the user through a user mobile device.

5. The system of claim 1, wherein the processing comprises determining whether the location and the time of the payment request is within parameters of the travel information for the user account.

6. The system of claim 1, wherein the location is determined through a user device when the payment request is made.

7. The system of claim 1, wherein the contact information comprises a temporary cell phone number.

8. The system of claim 1, wherein the security token is a keychain fob.

9. The system of claim 1, wherein the security token is a soft token generator.

10. A method for performing a payment transaction using a user device, comprising:

receiving, by a processor of a payment provider, authentication information to access a user account from a user when the user reaches a travel destination specified in the user account, wherein the authentication information includes a user ID and a password or PIN associated with the user account and a randomly generated password using a security token;

receiving, by the processor, a payment request from the user;

determining, by the processor, a location and a time of the payment request;

accessing, by the processor, the user account associated with the payment request;

determining, by the processor, travel information for the user account, wherein the travel information comprises contact information provided by the user for expected locations the user expects to be at and wherein the contact information is different for at least two of the expected locations; and processing the payment request based, in part, on the travel information.

11. The method of claim 10, wherein the travel information comprises at least one location and at least one date for the user while on travel.

12. The method of claim 11, wherein the travel information further comprises payment request limits for each location.

13. The method of claim 10, wherein the processing comprises determining whether the location and the time of the payment request is within parameters of the travel information for the user account.

14. The method of claim 10, wherein the contact information comprises a temporary cell phone number.

15. A non-transitory machine-readable medium comprising a plurality of machine-readable instructions which when executed by one or more processors of a server are adapted to cause the server to perform a method comprising:

receiving authentication information to access a user account from a user when the user reaches a travel destination specified in the user account, wherein the authentication information includes a user ID and a password or PIN associated with the user account and a randomly generated password using a security token;

receiving a payment request;

determining a location and a time of the payment request;

accessing the user account associated with the payment request;

determining travel information for the user account, wherein the travel information comprises contact information provided by the user for expected locations the user expects to be at and wherein the contact information is different for at least two of the expected locations; and processing the payment request based, in part, on the travel information.

16. The non-transitory machine-readable medium of claim 15, wherein the travel information comprises at least one location and at least one date for the user while on travel.

17. The non-transitory machine-readable medium of claim 16, wherein the travel information further comprises payment request limits for each location.

18. The non-transitory machine-readable medium of claim 15, wherein the processing comprises determining whether the location and the time of the payment request is within parameters of the travel information for the user account.

19. The non-transitory machine-readable medium of claim 15, wherein the location is determined through a user device when the payment request is made.

20. The non-transitory machine-readable medium of claim 15, wherein the contact information comprises a temporary cell phone number.

* * * * *